United States Patent [19]

Briggs

[11] 4,366,204

[45] Dec. 28, 1982

[54] FOAMED PLASTICS LAMINATES

[75] Inventor: Peter J. Briggs, Cheshire, England

[73] Assignee: Imperial Chemical Industries Limited, London, England

[21] Appl. No.: 272,468

[22] Filed: Jun. 11, 1981

[30] Foreign Application Priority Data

Jul. 11, 1980 [GB] United Kingdom ............... 8022711

[51] Int. Cl.³ .................... B32B 5/02; B32B 19/04
[52] U.S. Cl. .................. 428/304.4; 428/318.4; 428/319.1; 428/329; 428/331
[58] Field of Search .......... 428/310, 313, 315, 324, 428/328, 329, 331, 304.4, 318.4, 319.1

[56] References Cited

U.S. PATENT DOCUMENTS

| | | | |
|---|---|---|---|
| 4,130,687 | 12/1978 | Ballard et al. | 428/313.7 |
| 4,269,628 | 5/1981 | Ballard et al. | 428/317.9 |
| 4,271,228 | 6/1981 | Foster et al. | 428/324 |
| 4,292,363 | 9/1981 | Briggs | 428/319.1 |

*Primary Examiner*—William J. Van Balen
*Attorney, Agent, or Firm*—Cushman, Darby & Cushman

[57] ABSTRACT

Laminated foamed plastics articles, especially polyurethane and polyisocyanurate rigid foam panels, are faced with a fibrous composite material comprising fibres, especially glass fibres, and vermiculite lamellae. The vermiculite lamellae are preferably size-graded to eliminate larger lamellae. Preformed flexible layers of the fibrous composite material may be used to face rigid foam board in a continuous lamination process. The articles have good fire resistance properties.

6 Claims, 3 Drawing Figures

FOAMED PLASTICS LAMINATES

This invention relates to laminated articles having a core of foamed plastics material.

The usefulness of foamed plastics materials is well known. Flexible foams for instance, are widely used in furnishings, while rigid foams, because of their unusually good thermal insulation properties, find application in the fabrication of structural components for the building industry.

Unfortunately, a failing of most foamed plastics materials is their combustibility which is mainly due to their organic chemical structure. Further, the physical structure of the foam can assist the spread of fire.

Laminated articles having a core of foamed plastics material can be made continuously or batchwise in a mould or former. The process of continuous lamination usually involves deposition of a foam-forming plastics mixture onto one of two facing sheets and bringing the second sheet into contact with the mixture before it sets and sometimes before it foams. Conveniently, both for cheapness and ease of handling, the facing sheets are often of paper or aluminium foil which can be fed from rolls. These materials have obvious disadvantages, however, in a fire. Paper facings are flammable and aluminium foil can melt.

As building regulations become stricter there is an increasing need for a more fire resistant foamed plastics laminate.

Various ways of improving the fire resistance of these laminates have been tried which include incorporating flame retardant additives in the foam itself and using intumescent layers and incombustible facing materials. Incombustible materials which have been used include asbestos cement board; steel; aluminium; tempered glass; gypsum board and perlite board. While these materials provide fire resistant facings they lack flexibility and are therefore unsuitable for many applications and present handling problems in the continuous production of laminates. These problems are largely overcome by the use of flexible vermiculite sheets as described in our U.K. Pat. No. 2,007,153. Unfortunately these vermiculite sheets have low tensile and tear strengths and a tendency to crack on exposure to fire which impairs the fire resistance properties of the laminates faced with them. The present invention provides laminates with improved fire resistance properties while enabling flexible facings to be used if desired.

According to the present invention we provide a laminated article having a foamed plastics core covered, at least in part, with a fibrous composite material comprising fibre and vermiculite lamellae. The invention also includes a process for the manufacture of the laminated article.

Foamed plastics materials which may be used in the production of the laminated articles of the invention may be any such materials described in the prior art. Examples of these materials are polyurethane, polyisocyanurate, polyurea, polyolefin, polystyrene, phenol-formaldehyde, epoxy and other polymeric foams. Where the polymeric structure allows, the foams may be rigid, semi-rigid or flexible in nature although the invention finds greatest utility when the foamed plastics are of the rigid type used in constructional elements, especially rigid polyurethane and rigid polyisocyanurate foams, and when the laminate is made continuously. Generally, these foams will have a density in the range of from 10 to 60 kg/m$^3$. However, foams having higher densities, for example up to 1000 kg/m$^3$, may also be protected by the fibrous composite materials: these foams are usually prepared in a press or rigid mould by, for example, reaction injection moulding. If desired, the foams may contain conventional fire-retardant additives, for example tris(halogenoalkyl)phosphates, reinforcing fibres (for example glass fibre filaments or strands) and fillers (for example, fly ash, expanded perlite) which may have intumescent materials on their surfaces. Intumescent materials may also be used in the form of sheets and interleaved with the laminates or as part facing for the laminate. Other types of facing material may be used in part.

The term vermiculite is used to describe materials known mineralogically and commercially as vermiculite. By "vermiculite lamellae" we mean particles of delaminated vermiculite that are platelets having a high aspect ratio (length or breadth divided by thickness). They may be obtained by chemically delaminating vermiculite and preferably have a particle size of less than 50 microns. Such particles have a thickness of less than 0.5 micron, usually less than 0.05 micron and preferably less than 0.005 micron. Their aspect ratio is at least 100, preferably at least 1000, for example 10,000.

The formation of vermiculite sheets from swollen vermiculite after the vermiculite has been delaminated to reduce the size of the individual particles or lamellae to colloidal dimensions is described in, for example, the specifications of British Pat. Nos. 1,016,385, 1,076,786 and 1,119,305 and in particular in U.K. Pat. No. 1,593,382.

The process described in these U.K. patents is for the production of shaped articles, including sheets, papers and films, from vermiculite and comprises the steps of:

1. swelling by contacting vermiculite ore with an aqueous solution of at least one salt of sodium, lithium, or an organo substituted ammonium cation, followed by aqueous washing, so that the ore swells to at least twice, preferably four times, its original volume;

2. delamination of the swollen vermiculite by subjecting the particles in the aqueous suspension from step 1 to a shearing action until a suspension of vermiculite particles having dimensions less than 50 μm may be selected, the suspension producing a flocculated viscosity of at least 100 centipoises;

3. elimination from the suspension of all particles having a diameter larger than 50 μm, preferably larger than 20 μm; and 4. formation of shaped articles from the resultant aqueous suspension by removal of water whilst the article is being shaped against a solid surface by deposition of vermiculite particles from the suspension.

The flocculated viscosity is defined as the maximum viscosity which a suspension, after flocculation with dilute hydrochloric acid, and containing not greater than 7% by weight of vermiculite solids, will exhibit at a shear rate of 58 sec$^{-1}$.

The thickness of the vermiculite sheets obtained from this process may be in the range of 0.05 to 0.5 mm.

The present invention is based on the discovery that vermiculite lamellae when applied to fibres in the form of a suspension or slurry and particularly when graded in size by the elimination of larger particles from the slurry, adhere firmly to and give good coverage of the fibre surfaces. Debonding on flexing is resisted. Surprisingly, vermiculite seems to be quite specific in these properties amongst the family of layer silicate minerals which are not shared with, for example, talc, mica, kaolinite and montmorillonite.

Fibres which may be used in the present invention include inorganic fibres and organic fibres, both natural and synthetic, which may be short or long filaments, strands or yarns in random, chopped, woven, flocked, matted or meshed form.

As examples of inorganic fibres which may be used we mention glass fibres including fibres made from calcium alumina borosilicate glass (E-glass), other glasses such as those known in the trade as A- and C-glasses and specialist glasses such as R- and S-glasses, alumina and zirconia fibres, rock fibre and asbestos.

As examples of natural organic fibres we mention cellulosic fibres such as cotton, linen, jute, flax and hemp, kapok, sisal, kraft pulp, lignocellulosic fibres such as wood which may be in the form of wood chips and wool, as well as regenerated cellulose fibres including cellulose acetate and viscose rayons.

As examples of synthetic organic fibres we mention polyester, polyamide, polyacrylonitrile, polyvinyl alcohol, 'Aramid' aromatic polyamide, polypropylene, high density polyethylene, polyvinyl chloride and carbon fibres.

Of especial interest to us are glass fibres. These may be used in the form of short or continuous filaments having a diameter of for example 5 to 30 micron; continuous or chopped strands which may be composed of 10-1000 filaments; rovings which comprise several strands twisted, doubled and plied; and matrices of these. The matrices may be composed of, for example, regular woven mats and mats of random filaments, both short and long, random short chopped strands and random continuous strands. They may be of the 'high-loft' type or compact, substantially incompressible mats.

The fibrous composite material may also contain other chemicals, e.g. lubricants, sizes or binders from fibre-processing and fire-retardants, particularly those which retard the surface spread of flame such as halogenated materials, antimony trioxide, alumina trihydrate, borates and phosphates.

The fibrous composite materials of the invention may have a wide variety of forms and the lamellae may be present in the composite as a coating on the individual fibres of the composite, as a layer in which the fibres are embedded or as a coating or facing layer on one or both sides of a fibrous material such as a woven fabric or a felt, or as an inner layer between layers of the fibrous material. By way of illustration only and without in any way restricting the scope of the present invention, the following product forms are included within the term fibrous composite material:

1. Individual fibres coated with lamellae; the coating may be continuous or discontinuous but preferably is continuous such that it in effect encapsulates the fibre.

2. A layer of fibres embedded in a matrix comprising the lamellae.

3. A layer of fibres faced on one or both sides with a layer of lamellae.

4. Strands comprising multiple filaments, e.g. 100 to 1000 filaments, having lamellae coated onto the individual filaments and/or onto the strands.

5. Rovings comprising multiple strands twisted, doubled or plied together, having lamellae coated onto the filaments and/or the strands and/or onto the rovings.

6. A layer of fibres bonded together by lamellae.

7. Cellulosic fibres in the form of wood chips or sawdust coated with lamellae and formed into a board, e.g. chipboard using conventional adhesives and/or the lamellae themselves (especially where vermiculite is used) as the binding agent.

It will readily be appreciated that each of the above product forms comprising a layer of fibres may comprise a multi-layer structure of fibres and that the fibre layers may comprise loose fibres or may be a woven, knitted needlepunched, felted or otherwise unified structure. Furthermore, it is to be understood that in any of the product forms of the fibrous composite material the fibres may be continuous (filamentary) or discontinuous (staple), or agglomerates of fibres such as wood pulp or wood chips or shavings.

The amount of weight of lamellae applied to the fibrous material may vary within wide limits depending for example upon the intended fire/temperature duty of the composite, the desired flexibility of the composite, the required degree of structural integrity of the composite and whether the lamellae are applied as a coating or a facing for the fibrous material. In general, increasing the loading of lamellae on the fibrous material will increase the fire-performance of the fibres and the thermal conditions which the composite will withstand. We have observed, however, that in general very thin layers of lamellae, for example less than 1 micron thickness, are all that is required to upgrade the fire-performance and the high-temperature performance of the fibres. As a guide only, the loading of lamellae on the fibres of the composite will usually be from 0.05% to 100% by weight of the fibres, typically from 0.1% to 20% by weight. Amounts of lamellae greater than these may be used and indeed the composite may comprise as much or even more lamellae than fibres such that the composite is in effect a fibre-reinforced layer of lamellae, for example where high flexibility in the composite is unnecessary or undesirable; typical amount of fibres in such a structure may be from 5% to 50% by weight of the composite.

The amount of lamellae applied to the fibres will affect the degree of damage suffered by the fibres when the composite material is exposed to a flame or, in the case of low-melting fibres, to temperatures above the melting point of the fibres. Fibres coated only very thinly with lamellae may be charred or even completely burned by naked flames whilst increasing the thickness of the coating increases the resistance to damage of the fibres by the flame. Likewise, meltable fibres coated thinly may be melted by a flame or high temperature whilst increasing the coating thickness increases the resistance of the fibres to melting. In most practical applications of the invention the fibres of the composite material are likely to be damaged or even completely burned or melted by a flame or high temperatures. Nevertheless, in spite of this, the fire-performance of the composite material is not seriously impaired, especially the fire-barrier and flame-retardant properties of the composite material.

The composite material offers the best fire resistance when the vermiculite lamellae totally encapsulate the exposed surface of the fibres and preferably each individual fibre.

The extent to which the plastics foam is covered with the fibrous composite material will depend on the nature of the article to be made and the purpose for which it is to be used. In general, that part of the article which may become exposed to fire will be faced with a continuous layer of the fibrous composite material.

Where the core of foamed plastics material has no other protective facing, it may be desirable for it to be completely enveloped by the composite material. Alternatively, where part of the plastics foam is protected by impermeable incombustible materials such as metal facings, only the unprotected part may need to be covered. However, if another facing material is used which is damaged by fire this may be covered with the fire resistant composite material. For example, aluminum foil or plastics film which can melt in the heat of a fire are beneficially covered with the composite material which, if made in situ on the foil or film, adheres firmly to it.

The plastics foam may be covered with the composite material in any convenient manner. Thus the composite material may be formed in situ on the foam by, for example, depositing delaminated vermiculite lamellae from an aqueous suspension onto that part of the foam to be covered and the fibres embedded in the vermiculite layer. A self-adhering composite material is formed as the water is removed. Conveniently the vermiculite slurry is brushed onto the foam and the fibres pressed into it. The slurry readily encapsulates the fibres so that a top coate may not be necessary.

The amount of slurry used is normally such as to produce a loading of lamellae on the fibres of from 0.05% to 100% by weight of the fibres, typically from 0.1% to 20% by weight. However, as previously stated, a greater loading may be used and the composite material may comprise more lamellae than fibres. In this case the amount of fibres, in what is effectively a fibre-reinforced mayer of lamellae, is suitably from 5 to 50% by weight of the composite material.

Alternatively a ready formed composite material of vermiculite lamellae and fibres is used either for direct application to pre-formed foam plastics using a suitable adhesive which may be suspension of vermiculite, or by forming the foam plastics core on the composite material or between two layers of composite material, bonding of the plastics material to the material being achieved by the adhesive nature of the uncured foam. Thus the surfaces of a suitable mould may first be lined with the composite material and a foam-forming mix of a plastics material then introduced into the mould.

When the laminated article is to be in the form of a panel it may be produced batchwise in a suitably shaped mould as described above or continuously on any laminating machine suitable for the production of foam board. Such machines are well known in the art and comprise conveying means for continuously advancing flexible or rigid sheet material, usually in a horizontal plane; a spray device or other distributor for depositing a foam mix evenly over the surface of the sheet material, even distribution being achieved either by employing a spreader, multiple spray devices or by reciprocating the spray device transversely across the sheet material; and, if desired, means for bringing a second sheet material into contact with the foam before it has set or possibly before or during foaming. When the foam is formed between two facing sheets, the laminate will normally be transported and allowed to foam between two parallel conveyors, the conveyors being either maintained at a set distance apart or designed to exert a predetermined pressure on the foam. The foam mix may even be deposited on the upper of two sheets which is inverted when the foam mix no longer flows under gravity but is still tacky and brought into contact with the lower sheet. Either one or both sheets may be a composite material comprising vermiculite lamellae and fibres. Where only one sheet is such a composite material, the other sheet may be of any other material which is flexible or rigid and may be of an incombustible material such as mentioned above. The foam core may itself contain glass fibre or other reinforcement to improve the stiffness and fire performance of the article.

Rigid facing materials will normally be in the form of discrete sheets which are fed into the laminating machine in abutment. More conveniently, flexible material is used which is in the form of continuous or semicontinuous sheets fed from rolls.

Suitable pre-formed fibrous composite materials are prepared by applying an aqueous slurry of delaminated vermiculite, preferably size-graded to eliminate particles having a diameter in excess of 50 microns, to fibres by techniques such as brushing, squeegeeing, knife and roller coating, spraying and dip coating and then drying.

Calendering before drying may be desirable to assist impregnation of fibre mats by the slurry and to remove excess slurry. It may also serve to remove any entrained air, preventing blistering in a fire and enhancing the appearance of the composite material.

Usually the lamellae will be applied from a suspension in a carrier liquid which may be, for example, water or another aqueous medium. Conveniently the suspension obtained from the process of chemical delamination can be used directly. In one such process a vermiculite slurry is prepared by stirring vermiculite ore in brine for about half an hour at 80° C. The suspension is centrifuged and washed with de-ionised water and the wet cake then stirred with a swelling agent, for example n-butylamine hydrochloride, for another half hour at 80° C. This suspension is similarly centrifuged and washed and the cake slurried in de-ionised water. The slurry is milled and particles having a diameter in excess of 50 micron removed using, for example a weir-type centrifugal classifier.

Normally slurries of 2 to 40%, more often 10 to 20%, by weight of vermiculite in the slurry are used. For brushing, knife and roller applications slurries of 18 to 20% are conveniently used but more dilute slurries are suitable for spraying applications, e.g. 10–12% by weight of vermiculite, and for dip impregnation, e.g. 4% by weight of vermiculite. Dilution is preferably achieved with de-ionised water.

The fibrous composite material may be rendered water stable by exchanging the swelling n-butylamine cation for a non-swelling cation such as a magnesium cation. This may be done by immersing the composite material in a saturated solution of magnesium chloride at an elevated temperature or by mixing rapidly magnesium oxide powder (approximately 10% on dry weight of vermiculite) with the aqueous vermiculite slurry and then coating or impregnating the fibres. This latter treatment must be accomplished quickly, i.e. in less than 30 seconds, because of the fast ion exchange reaction.

Normally, the fibrous composite material will be flexible and conveniently rolled for storage and handling. It is therefore a particular advantage of the present invention that a lightweight, fire-resistant foam laminate can be produced using facing sheets which can be fed from rolls in the same may as paper. It is a further advantage that where the laminated article is made in a mould having a curved or other shaped surface the composite material can take up the shape of the mould as the foam expands.

As well as having good fire resistance properties, the fibrous composite material has a low water vapour transmission coefficient. This is important because the ingress of water vapour into the closed cells of rigid foams, such as polyurethane and polyisocyanurate rigid foams, causes an increase in thermal conductivity thereby decreasing the insulation value of the foam on ageing. The thin vermiculite lamellae on the fibre surfaces also give dimensional stability to the fibres at high temperatures. Even low weight fibre mats treated with vermiculite slurry resist curling or melting at temperatures up to 1100° C.

The invention is illustrated but not limited by the following Examples in which parts and percentages are by weight.

EXAMPLE 1

Preparation of Vermiculite Slurry

150 Parts of vermiculite ore (Mandoval micron grade ex-South Africa) are agitated with saturated sodium chloride solution in 1:2 ratio in a tank for 30 minutes at 80° C. This suspension is then centrifuged and washed with deionised water. The wet cake is transferred to a second tank where the vermiculite is stirred with 1.5 N n-butylamine hydrochloride (2:1 liquid:solid ratio) for 30 minutes at 80° C. This suspension is then centrifuged and washed with deionised water before transferring the wet cake to a swelling tank in which the vermiculite is stirred in deionised water. After swelling the slurry is approximately 20% solids and the particles random sized in the range 300–400 micron. This slurry is then passed through a stone-type mill which reduces approximately 50% particles to less than 50 micron. This milled slurry is classified in a weir-type centrifugal classifier and the lighter particles with sieve size less than 50 micron collected for use. Analysis of this 18–21% solids slurry by photosedimentometer and disc centrifuge reveals approximately 40% particles having a size ("equivalent spherical diameter") of 0.4–1.0 micron.

Production of Plastics Foam Laminate

Polyisocyanurate rigid foam laminate (45 mm thick) was produced on a horizontal laminator made by Viking Engineering Co. Ltd., Stockport, Cheshire and described in an article entitled "A New Development Machine for the continuous lamination of rigid urethane foam" published in "Rubber and Plastics Age", Vol. 47 (1966) No. 1, page 57. The foam-forming ingredients, Part A and Part B, formulated as described below, were separately fed to a high pressure impingment mixing-gun fitted with a spray-type nozzle and mounted on a traversing device and dispensed onto a laydown facing sheet.

| | Parts by weight |
|---|---|
| Part A | |
| Oxypropylated tolylene diamine (OHV 310) | 20.4 |
| An ethylene oxide/propylene oxide adduct | 4.0 |
| A catalyst composed of ethylene glycol (20 p.b.w.), potassium acetate (20 p.b.w.) and water (1.5 p.b.w.) | 1.5 |
| Silicone L5420 (ex Union Carbide) | 1.0 |
| "Arcton" 11 | 28 |
| Part B | |
| Polymeric MDI (isocyanate strength of 91.5%) | 100 |

During the lamination, 120 g/m$^2$ continuous strand glass fibre mat Unifilo PS 198 (obtainable from Balzaretti Modigliani SpA [Vetrotex, Saint-Gobain] Divisione Tessili, 20146 Milano, Via Romagnoli 6) was carried on the laydown facing underneath the dispense-head. The resulting foam had a density of 35 kg/m$^3$ and a good distribution of glass fibres throughout the core.

For comparative purposes only, laminates were made using as a top facing the following materials:

(A) Flame retardant paper FIX (weight 250 g/m$^2$) supplied by Sodra Skogsagarna AB, Stromsnas Bruk, S-280 50 Stromsnasbruk, Sweden.

(B) Bitumenized Asbestos Felt Nicolet 466 (weight 640 g/m$^2$) supplied by the Nicolet Corporation, U.S.A.

(C) Black pigmented low density polyethylene coated glass fibre tissue mat (weight 60/30 g/m$^2$ of glassfibre/polyethylene) supplied by Van Gelder Papier NV., Parnassnsweg 126, Amsterdam 1009, Holland.

Also for comparative purposes, a laminate faced with vermiculite lamellae only was prepared as described in (D).

(D) The laydown face was removed from a portion of laminate 17.5×17.5 mm$^2$ and coated with 18% solids classified vermiculite slurry prepared as described above. The slurry was brushed evenly over the foam surface and allowed to dry at ambient temperature for 48 hours. The weight of vermiculite applied was 96.8 g/m$^2$.

(E) The procedure described in (D) was repeated except that after brushing on the vermiculite slurry, a sheet of 53 g/m$^2$ glass fibre tissue mat IE50U (supplied by Regina-Fibreglass Ltd., Liversedge, West Yorkshire WF15 8AA) was pressed uniformly into the wet layer of vermiculite (107.5 g/m$^2$). This composite material was then allowed to dry for 48 hours at ambient temperature.

(The glass fibre tissue mat is made by a wet process using filamentised E-glassfibre and bound with approximately 18% urea-formaldehyde resin).

(F) The procedure described in (D) was repeated except that after brushing on the vermiculite slurry, a sheet of 55 g/m$^2$ glass fibre surface veil mat Surmat 200 (supplied by Nicofibers Inc., Ironpoint Road, Shawnee, Ohio, U.S.A.) was pressed uniformly into the wet layer of vermiculite (98.9 g/m$^2$).

(The glass fibre mat is believed to be produced from A-glass and built up from long glassfibre filaments).

The fire resistance of samples of the laminates was tested by subjecting the samples to thermal radiation by the method and in the apparatus hereinafter described with reference to FIG. 1 of the accompanying drawings.

Figure 1:
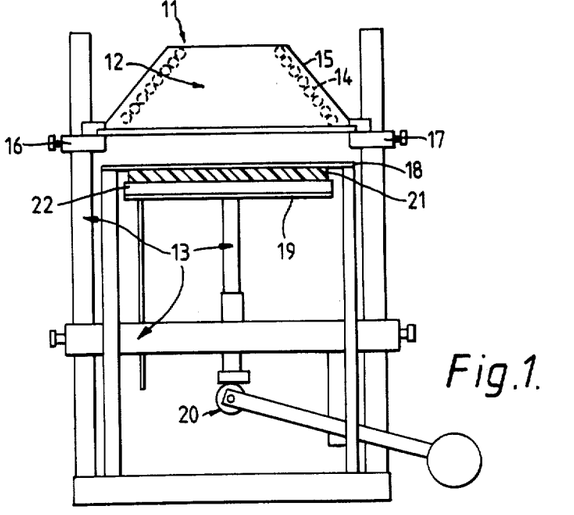
FIG. 1 illustrates an apparatus for subjecting samples of laminate to thermal radiation.

In FIG. 1, test apparatus 11, shown diagrammatically in front elevation, consists of a radiator 12 and specimen holder 13. The radiator 12 has a stainless steel heating tube 14 which is bent in a truncated cone shape and fixed together by NiCr-wire. The tube 14 is covered by a shade 15 consisting of two shells of heat resistant steel with an insulating ceramic fibre blanket interposed therebetween. The heating tube 14 is fastened to the shade 15 by NiCr-wires. Two clamps 16 and 17 serve to fix the radiator above the specimen holder 13 which is of stainless tubular steel construction. A mask 18 supported by the specimen holder has a circular opening (not shown) of 150 mm diameter. A press plate 19, covered with asbestos millboard 22, and counter-weighted throughout a leverage system 20, holds a sample of foam laminate 21 against the mask 18.

Samples were held in the test apparatus for 4 minutes, with their faces to be tested nearest the radiator. The radiator generated an intensity of 4 W/cm$^2$ radiant flux giving a surface temperature on the laminate facing of 600° C. After cooling, the samples were assessed for:

(i) weight loss;
(ii) depth of charring;
(iii) change of laminate thickness; and
(iv) condition of the facing and charred foam.

The test method using this "ISO Radiant Cone" is based on an "Ignitability Test for Building Materials" by P.Topf of the Institut Fur Holzforschung, University of Munich. Results are shown in Table 1.

that the following foam formulation (Parts A and B) was used and the glass fibre in the foam core excluded.

|  | parts by weight |
|---|---|
| Part A | |
| An activator whose composition is described below | 36.2 |
| A catalyst composed of ethylene glycol (20 p.b.w.), potassium acetate (20 p.b.w.) and water (1.5 p.b.w.) | 0.4 |
| "Arcton" 11 | 20 |
| Part B | |
| Polymeric MDI (isocyanate strength about 90%) | 100 |

The activator was composed of the following ingredients:

|  | parts by weight |
|---|---|
| Polyester from adipic acid, phthalic anhydride, propylene glycol, glycerol (OHV = 250) | 11.4 |
| A 50:50 mixture of oxypropylated tolylene diamine (OHV = 480) and oxypropylated triethanolamine (OHV 525) | 9.0 |
| An ethylene oxide/propylene oxide adduct | 2.0 |
| Cirrasol EN-MP (ethylene oxide-oleyl cetyl alcohol adduct) | 2.0 |
| Trichloropropyl phosphate | 10.0 |
| Silicone L5340 | 0.8 |
| A catalyst composed of ethylene glycol (20 p.b.w.), potassium acetate (20 p.b.w.) and water (1.5 p.b.w.) | 1.0 |

TABLE 1
RESULTS OF ISO CONE TESTS (4 MINUTE DURATION)

| Laminate Facing | Reference Letter | Weight loss of laminate (%) | Depth of Black Char at centre of sample (mm) | Overall thickness of laminate after test (mm) | Appearance of facing after test | Appearance of charred foam after test |
|---|---|---|---|---|---|---|
| Flame retardant paper | A* | 27.9 | 27 | 36 | Peeled back and cracked over all area | Cracks 50 mm wide and 5 mm deep |
| Bitumenised Asbestos Felt | B* | 24.1 | 23 | 30 | Integral face with minor blisters | Peripheral crack 2 mm wide, 5 mm deep |
| Polyethylene-coated glass fibre | C* | 30.5 | 27 | 36 | Wrinkled edges; integral. | Minor crazing 2 mm wide, 3 mm deep |
| Vermiculite | D* | 18.1 | 20 | 40 | Cracks up to 40 mm long with blisters | Minor cracking 0.5 mm wide, 1-2 mm deep |
| Glassfibre-vermiculite composite | E | 19.8 | 20 | 40 | Completely integral | Minor crazing 1 mm wide, 3 mm deep |
| Glassfibre-vermiculite composite | F | 19.1 | 20 | 40 | Completely integral | Minor crazing 1 mm wide, 3 mm deep |

*The laminates referred to A to D do not illustrate the invention but are included for comparative purposes only.

Discussion of Results

These results indicate the superior fire barrier properties of the glass fibre-vermiculite composites (E and F) compared to other typical commercial facings and vermiculite on its own. The marginally higher weight losses of laminates E and F compared to D is believed to be associated with loss of urea-formaldehyde binder from the glass fibre tissue.

EXAMPLE 2

Polyisocyanurate rigid foam laminate (60 mm thick) was produced by the procedure of Example 1 except Kraft paper was used to face the foam which had a density of 35 kg/m$^3$.

(A) For comparative purposes only, 18% vermiculite slurry, prepared as described in Example 1, was brushed evenly onto the surface of a 17.5 mm × 17.5 mm section of laminate from which the laydown face was removed and allowed to dry at ambient temperature for 48 hours.

The weight of vermiculite applied was 82 g/m². it was well bonded to the foam surface.

(B) 18% vermiculite slurry, prepared as described in Example 1, was brushed over the foam surface of a section of laminate similar to that used in (A) and a sheet of 53 g/m² glass fibre tissue mat IE50U was pressed into the wet layer of vermiculite. This composite was then allowed to dry for 48 hours at ambient temperature.

These sections of laminate were then tested under the "ISO Cone" as described in Example 1. The results obtained are shown in Table 2.

TABLE 2

| Reference Letter | Facing | Appearance of facing after test | Appearance of foam char after test |
|---|---|---|---|
| A* | Vermiculite | Cracks up to 12 mm wide at edge and fissures centre. Brittle. Severe blistering caused some debonding at the centre of the test panel. | Large edge crack up to 20 mm wide and 13 mm deep |
| B | Vermiculite + glass fibre tissue | Completely integral without cracks. Tough. The facing was still strongly bonded to the foam surface. | Crazed surface with fissures 1–5 mm wide. |

*The laminate referred to as A does not illustrate the invention but is included for comparative purposes only.

EXAMPLE 3

Polyisocyanurate rigid foam laminate (60 mm thick) was produced as in Example 2. The Kraft paper facing was removed from the laydown face and six 17.5 × 17.5 mm¹ sections of the exposed foam were then treated as follows:

(A) 18% Vermiculite slurry, (prepared as described in Example 1), was brushed uniformly over the surface and allowed to dry at ambient temperature for 48 hours. The weight of vermiculite applied was 49.2 g/m²; foam adhesion was excellent.

(B) 18% Vermiculite slurry was brushed over the foam surface and a sheet of 53 g/m² glass fibre tissue mat IE50U was pressed into the wet layer of vermiculite. After drying, the weight of vermiculite applied was determined as 52.8 g/m². Adhesion to the foam surface was excellent.

(C) 17.5% Aqueous slurry of micronised mica (Grade C300 supplied by The English Mica Company, Stamford, Conn. 06905, U.S.A.) was applied in similar manner to the vermiculite slurry in (A) and dried. This coating was powdery and poorly bonded to the foam surface. Weight of mica supplied was 64.2 g/m², (D) 17.5% Mica slurry (as used in C) was applied to the foam and a sheet of glass fibre mat IE50U pressed into the wet mica layer. After drying, the weight of applied mica was found to be 69.5 g/m². This facing was again poorly bonded to the foam and was powdery to the touch.

(E) 17.5% Aqueous slurry of micronised talc (grade AT.1 supplied by Tecnimetal SA, Kerklaan 67, 1830-Machelen, Belgium) was applied to the foam and dried. The weight of talc applied was 52.6 g/m². As in C, there was almost no bond to the foam surface.

(F) 17.5% Talc slurry (as used in E) was applied to the foam and a sheet of glass fibre mat IE50U was pressed into the wet talc layer. After drying, the weight of talc was found to be 86.5 g/m². Similarly to D, there was negligible bonding to the foam.

The above sections of laminates together with a section from which the Kraft paper had not been removed, were tested on the "ISO Cone" with the mineral facing uppermost as described in Example 1 except that the time of the test was 6 minutes. The results are shown in Table 3.

Discussion of Results

The superiority of vermiculite in adhesive and fire-barrier properties over the related layer silicate minerals, mica and talc, is clear.

The unreinforced vermiculite facing in laminate A ruptured after only 6 seconds and flames burnt through the crack for the remainder of the test. This rapid facing failure is thought to be associated with the rapid expansion in foam dimensions at 600° C. which creates a high tensile stress in the well-bonded vermiculite layer. It is noted that this effect is not so marked in laminates in which the foam core is reinforced with glass fibre (laminate (D) in Example 1). The introduction of glass fibres into the vermiculite layer resists facing cracks and even modifies the type of cracking in the polyisocyanurate foam char (see Table 2, Laminates A and B).

TABLE 3

RESULTS OF ISO CONE TESTS (6 MINUTE DURATION)

| Laminate Facing | Reference Letter | Weight loss of laminate (%) | Depth of Black Char at centre of sample (mm) | Maximum Crack Depth (mm) | Appearance of facing after test | Appearance of foam char after test |
|---|---|---|---|---|---|---|
| Vermiculite | A* | 22.7 | 40 | 27 | 3 Major cracks + several minor fissures. Facing still bonded at edges of sample. | Deep edge cracks. |
| Vermiculite + glass fibre | B | 23.6 | 34 | 13 | Facing intact and wrinkled on cooling. Good bond to foam remains. | Crazed surface with fissures 0.5–2 mm wide |
| Mica | C* | 27.7 | 42 | 33 | Facing powdered and flaked off. Complete lack of bond to foam. | 4 Deep cracks, 13–20 mm wide. |
| Mica + | D* | 26.2 | 46 | 35 | Facing intact | Deep cracks. |

TABLE 3-continued

RESULTS OF ISO CONE TESTS (6 MINUTE DURATION)

| Laminate Facing | Reference Letter | Weight loss of laminate (%) | Depth of Black Char at centre of sample (mm) | Maximum Crack Depth (mm) | Appearance of facing after test | Appearance of foam char after test |
|---|---|---|---|---|---|---|
| glass fibre | | | | | but completely debonded Powdery suface. | |
| Talc | E* | 29.3 | 41 | 35 | Facing powdered. No bond to foam. | 4 Deep cracks, |
| Talc + glass fibre | F* | 27.5 | 45 | 40 | Facing intact. No bond to foam. Powdery surface. | Deep, wide |
| Kraft paper | —* | 26.0 | 50 | 40 | Paper charred and peeled back over whole surface. | 3 Deep cracks (4-10 mm wide) + several minor. |

*These laminated do not illustrate the invention but are included for comparative purposes only.

EXAMPLE 4

Vermiculite slurry (21% w/w solids), prepared as described in Example 1, was spread with a knife coater over 53 g/m² wet process glass fibre tissue mat IE50U supplied by Regina-Fibreglass Ltd. After drying, the weight of vermiculite was determined to be 80 g/m².

Polyisocyanurate rigid foam laminate (30 mm thick) was produced on a Viking horizontal laminator (see Example 1) at 4 m/minute by laying down the liquid foam chemicals dispensed from a reciprocating spray mixing-head traversely over the above vermiculite-glass fibre sheet, which was continuously fed from a roll. P2 Kraft paper (160 g/m² paper coated with 18 g/m² LD-polyethylene) was used as the contact facing. The foam-forming ingredients, Part A and Part B, formulated as described below were separately fed to the mixing-head to provide an output of 5.3 kg/minute.

| | parts by weight |
|---|---|
| Part A | |
| An activator whose composition was described in Example 2 | 36.2 |
| A catalyst composed of ethylene glycol (20 p.b.w.), potassium acetate (20 p.b.w.) and water (1.5 p.b.w.) | 1.0 |
| Arcton 11 | 20 |
| Part B | |
| Polymeric MDI (isocyanate strength about 90%) | 100 |

After curing for 24 hours, the laminate was examined by the "ISO Cone" test at various times and compared with laminate prepared simultaneously with Kraft paper on both facings.

Discussion of Results

The results (shown in Table 4) illustrate the excellent protective effect which the vermiculite-glass fibre facing gives to the foam. This vermiculite facing prevented ignition and remained as a crack-free barrier throughout the tests.

TABLE 4

RESULTS OF ISO CONE TESTS AT 620° C. SURFACE TEMPERATURE

| Laminate Facing | Time Under Cone (mins.) | Weight loss of laminate (%) | Depth of Black Char at centre of sample (mm) | Depth of cracks (mm) | Width of cracks (mm) | Appearance of sample after test |
|---|---|---|---|---|---|---|
| Vermiculite + glass fibre | 1 | 10.9 | 3 | 0 | 0 | All facings were integral and uncracked during and after these tests. Foams were dimensionally stable. ˣThere were fissures over foam surface under facing. |
| | 3 | 17.6 | 13 | 0 | 0 | |
| | 4 | 20.1 | 14 | 0 | 0 | |
| | 6 | 24.0 | 15 | 1-2 | 1-2 | |
| | 10 | 26.6 | 20 | 0.5-3 | 0.5-2ˣ | |
| Kraft Paper** | 1 | 23.2 | 13 | 1 | 2 | Minor circumferential fissure |
| | 3 | 36.9 | 28 | 1 | 2 | |
| | 4 | 38.0 | 20 | 2 | 2 | Cracked char. Char severly distorted and shrunk at edge. ˣThis sample showed severe |
| | 6 | 42.1 | 30 | 3 | 8 | |
| | 10 | 47.6 | 20* | 10 | 2-10ˣ | |

TABLE 4-continued
RESULTS OF ISO CONE TESTS AT 620° C. SURFACE TEMPERATURE

| Laminate Facing | Time Under Cone (mins.) | Weight loss of laminate (%) | Depth of Black Char at centre of sample (mm) | Depth of cracks (mm) | Width of cracks (mm) | Appearance of sample after test |
|---|---|---|---|---|---|---|
| | | | | | | scorching on the back face. |

*There was no uncharred foam left in this sample.
≠All these samples ignited at 5 seconds followed immediately by rupture of the paper facing.
**This laminate does not illustrate the invention but is included for comparative purposes only.

EXAMPLE 5

Polyisocyanurate foam laminate was prepared according to the technique described in Example 4. During part of the lamination run, Unifilo PS 198 (a continuous strand glass fibre mat, previously stretched to break interstrand bonds) (supplied by Vetrotex (UK) Ltd. and manufactured by Balzaretti Modigliani SpA, Italy) was fed underneath the foam mixing-head so that this laminate was reinforced with glass fibre throughout the foam core.

Two samples of this laminate were subjected to the "Mini-Corner Fire Test" which is used to evaluate the surface burning characteristics of building materials. It is described in the following publications:

(a) The Society of the Plastics Industry, Inc., Serial No. 22000.5, Feb. 3, 1976, Factory Mutual Research.

(b) ASTM D20.30.03, Draft test method (Oct. 1978). The test method is significant since a corner provides a critical surface geometry for evaluating the fire response of material surfaces. It incorporates three adjacent surfaces (two walls and ceiling) providing a combined heat flux which includes the conductive, convective, and radiative responses of any specific burning material. This corner test affords good simulation of a fire within the corner of a building.

Figure 2:
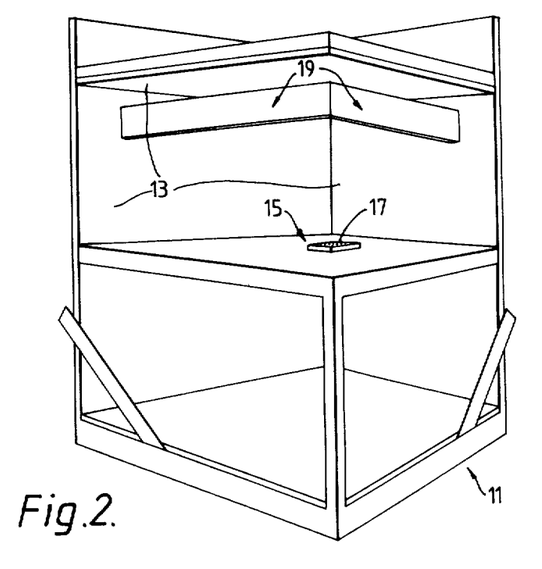
FIG. 2 illustrates a test rig suitable for carrying out the Mini-Corner Fire Test.
Figure 3:
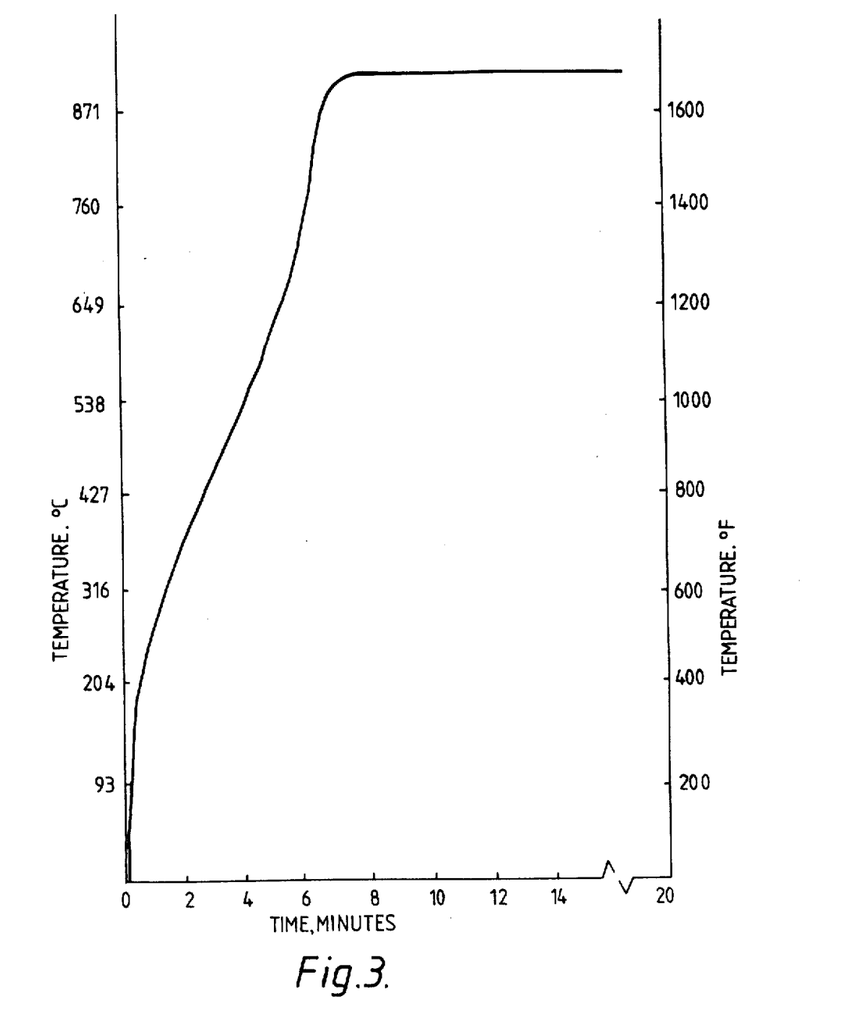
FIG. 3 illustrates the standard temperature/time cure simulated by adjustment of gas flows in carrying out the Mini-Corner Fire Test.

A test rig suitable for carrying out the Mini-Corner Fire Test, is illustrated in FIG. 2 which is a diagrammatic perspective view of the rig. It is constructed from an angle iron frame 11 covered with 6.4 mm asbestos cement board 13 on two side walls and ceiling. A gas burner 15 consists of a flat plate 17 with a square grid pattern of holes drilled in the surface. The holes are 2.4 mm diameter spaced in a 9×9 pattern with hole spacing of 7 mm. A mixing chamber (not shown) for the gas supply is cylindrical in shape 114 mm by 63 mm high. Separate propane gas and air streams are fed into opposing arms of an inverted 'T', brought into the chamber through the bottom and exhausted upwards. When ignited the gas flows are adjusted to simulate the standard temperature/time curve shown in FIG. 3. The laminated foam board to be tested was secured to the walls and ceiling with the joints sealed with ceramic cement.

The two laminate samples tested both survived the full 15 minute test duration with flames confined within 3 feet of the corner for most of the test. After extinction of the burner, the glass fibre/vermiculite facings were examined and found to be structurally integral and free from cracks. The foam was charred on the ceiling and partially on the walls. There were several cracks in the unreinforced foam char extending 6 to 24 inches from the corner. Only 1 minor crack was evident in the char of the glass fibre-reinforced laminate.

EXAMPLE 6

Wet process glass fibre tissue mat IE50U (50 g/m$^2$) supplied by Regina-Fibreglass Ltd., Cleckheaton, Yorkshire was coated with 18% by weight of (i) milled but non-classified vermiculite slurry (prepared as previously described) and (ii) classified vermiculite slurry. Similar tissue was coated with a 50% aqueous slurry of Kaolinite ("Supreme" grade supplied by English China Clays Co. Ltd., St. Austell, Cornwall: 94% (min.) of the Kaolinite particles in this product are less than 2 μm and approx. 60% are finer than 0.5 μm).

| | Coating | Dry Coating weight (g/m$^2$) | Bond Strength* to glass fibre mat (g/cm) |
|---|---|---|---|
| (i) | Non-classified Vermiculite | 70 | 30 |
| (ii) | Classified Vermiculite | 52 | 61 |
| (iii) | Kaolinite | 70 | 0 (no measurable strength owing to dusty nature of coating). |

*This was a 180° "peel test" using adhesive tape to pull away the coating.

Discussion of Results

This Example shows the superior bond strength of classified vermiculite slurry over milled, non-classified slurry and the superior bond strength of both over Kaolinite. Similar behavior to that of Kaolinite occurs with mica and talc and confirms the specific characteristic of vermiculite to have self-adhesive properties when coated onto fibres.

EXAMPLE 7

(A) Preparation of Facings (A.1) 18% Vermiculite slurry, prepared as described in Example 1, was brushed uniformly onto polyethylene terephthalate (PET) fibre scrim (LF38 latexed; 20 g/m$^2$) and allowed to dry at ambient temperature for 48 hours. The weight of vermiculite/polyester facing was 110 g/m$^2$.

(A.2) 556 g of 18% Vermiculite slurry, prepared as described in Example 1, was mixed with 100 g Spinrock Fox fibres (supplied by Rockwool International A/S, DK-2640 Hedehusene, Denmark) and then diluted to 8% w/w with deionised water. The resulting slurry was then cast onto a glassplate and allowed to dry at ambient temperature for 48 hours. The weight of vermiculite/rockfibre facing was 380 g/m$^2$.

(A.3) 18% Vermiculite slurry were coated onto melded polyethylene terephthalate fibre scrim and dried. The weight of polyester/vermiculite facing was 70 g/m$^2$.

(B) Preparation of foam laminates

Polyisocyanurate rigid foam laminate (30 mm thick) was prepared using the procedure and formulation of Example 2 with polyethene-coated Kraft paper as the facings. During the lamination process, samples A1, A2 and A3 were taped to the laydown face. After curing for 24 hours, the Kraft paper was peeled away from the sample facings prior to fire-testing.

(C) Fire tests

The sections of laminate were tested under the ISO Cone as described in Example 1. During these tests, a lighted taper was held over the top sample facing to ignite any flammable gases and the temperature rise above the sample was measured with a thermocouple. The results are shown in Table 5. These results show the protective effect of the vermiculite/fibre facings on the foam laminate.

TABLE 5

| Time Under Cone (mins) | Increase in Temperature (°C.) (initial temperature: 340° C.) | | | |
|---|---|---|---|---|
| | Kraft Paper (control) | Vermiculite/ Polyester | Vermiculite/ Rockfibre | Vermiculite/ melded PET |
| 0.5 | 310 | 90 | 90 | 110 |
| 1.5 | 420 | 125 | 135 | 135 |
| 3 | 250 | 160 | 145 | 160 |

| Examination of the samples after 10 minutes under the ISO Cone showed the following | |
|---|---|
| Facing | Appearance |
| Kraft paper (control) | Soft, powdery char with severe cracking (25 mm deep, 5-17 mm wide). |
| A.1 Vermiculite/Polyester | Facing intact. Hard char with no cracks. |
| A.2 Vermiculite/Rockfibre | Facing intact. Hard char with fine fissures (max. 3 mm deep). |
| A.3 Vermiculite/melded PET | Facing intact. Hard char with no cracks. |

EXAMPLE 8

Polyisocyanurate rigid (PIR) foam laminate (1.2 m wide, 45 mm thick) was produced by the procedure of Example 1 except 0.8 parts by weight of the same catalyst blend was used in the foam formulation. During part of the lamination run, 150 g/m$^2$ continuous strand glassfibre mat Unifilo PS 271 (Vetrotex) was pre-stretched to 140 g/m$^2$ and then carried on the laydown facing underneath the dispense-head. Thus reinforced and unreinforced foam board was produced. The unreinforced foam had a density of 31.4 kg/m$^3$ and the reinforced foam had a density of 38.5 kg/m$^3$. The reinforced foam board contained glassfibre strands distributed uniformly through the thickness of the foam. Both facings used in this lamination were prepared by impregnating and coating 1.3 m wide rolls of 50 g/m$^2$ glassfibre tissue mat IE 50U (Regina-Fibreglass Ltd.) with 18% classified vermiculite slurry (prepared by the technique described in Example 1); this treatment was carried out using a knife-on-blanket coating-head with drying at 150° C. The final weight of the vermiculite/-glass facing was 125 g/m$^2$.

The laminates were evaluated by Factory Mutual Research Corporation, Norwood, Massachusetts, U.S.A. in their calorimeter test for insulated steel deck roofs (Factory Mutual Research Approval Standard 4450). Sample boards of 4 foot×3 foot size were bonded to the profiled steel deck using hot asphalt applied at 15 lb./100 ft$^2$; the remaining space on the 5 foot×5 foot size steel deck was covered by sample boards cut and butt-jointed to the first board. Three 25 lb. moppings of asphalt at 375° F. were applied to the top of the insulation boards to stick down 3 layers of perforated asphalt-impregnated asbestos roofing felt. After 2 days, this insulated sample steel roof-deck was exposed to the standard 30 minute fire in the Calorimeter where heptane burners generate a temperature of approximately 815° C. underneath the test sample. Temperatures of the gases in the flue were monitored throughout the 30 minute test. An evaluation run with a refractory blank in the test position was then carried out using propane as the evaluating fuel. The fuel contribution rate of the test sample was then calculated and the following results obtained:

| Test Laminate | Max. average rate of fuel contribution (BTU/ft$^2$/min) for various intervals of time | | | |
|---|---|---|---|---|
| | 3 minutes | 5 minutes | 10 minutes | Average over 30 minutes |
| (a) PIR foam, unreinforced | 251 | 241 | 224 | 199 |
| (b) PIR foam, reinforced with Unifilo PS 271 glassfibre | 277 | 256 | 215 | 209 |
| (c) Class I Standard for FM Approval | 385 | 365 | 340 | 270 |

Large scale fire tests conducted in a 100 foot long×20 foot wide building by Factory Mutual Research Corporation have shown that composite steel roof deck assemblies with fuel contribution rates lower than those above quoted for the Class I Standard do not represent a rapid spreading fire hazard potential when subjected to an interior fire.

Discussion of Results

The above results confirm that PIR foam insulation boards faced with the classified vermiculite/glassfibre mats satisfy the low fuel contribution rates required by the Class I Factory Mutual Standard. By comparison, a board prepared from the same PIR formulation faced with polythene-coated glassfibre mat (60 g/m$^2$ glass, 30 g/m$^2$ polythene) failed the Calorimeter test due to ignition of the asphalt deck-covering after only 16 minutes. Until these test results with classified vermiculite/glass fibre facings were available, the only foam laminates prepared from flexible facings which satisfied the Class I standard utilised asbestos felts to provide fire barrier properties.

EXAMPLE 9

Polyisocyanurate rigid (PIR) foam laminate (1.2 m wide, 52 mm thick) was produced by the procedure of Example 1 using the following formulation:

| | Parts by weight |
|---|---|
| Part A | |
| Oxypropylated tolylene diamine (OHV 310) | 20.4 |
| An ethylene oxide/propylene oxide adduct | 14.0 |
| A catalyst composed of ethylene glycol (20 p.b.w.), potassium acetate (20 p.b.w.) and water (1.5 p.b.w.) | 0.7 |
| Silicone L 5340 (Union Carbide) | 1.5 |

| | Parts by weight |
|---|---|
| "Arcton" 11 | 18.0 |
| Part B | |
| Polymeric MDI (isocyanate strength of 91.5%) | 100 |

The facings for this laminate were the same as these in Example 8. The foam was reinforced with Unifilo PS 271 (Vetrotex) glassfibre strands and had a density of 44.8 kg/m³. The laminate was evaluated by Factory Mutual Research Corporation, U.S.A. in their Calorimeter test as outlined in Example 8. The insulated steel deck survived the 30 minute fire exposure and the fuel contribution rate was determined to be within those allowed for the Factory Mutual Class I Standard.

| Test Laminate | Max. average rate of fuel contribution (BTU/ft²/min) for various intervals of time | | | |
|---|---|---|---|---|
| | 3 minutes | 5 minutes | 10 minutes | Average over 30 minutes |
| PIR foam reinforced with Unifilo PS 271 glassfibre | 251 | 231 | 217 | 161 |

I claim:

1. A laminated article having a foamed plastics core covered, at least in part, with a fibrous composite material comprising fibre and vermiculite lamellae.

2. An article according to claim 1 in which the foamed plastics core is made of rigid polyurethane or polyisocyanurate foam.

3. An article according to claim 1 in which the vermiculite lamellae have a particle size of less than 50 microns.

4. An article according to claim 1 in which the fibrous material is made of glassfibre.

5. An article according to claim 1 in which composite layer contains vermiculite lamellae in amount of from 0.05% to 100% by weight of the fibrous material.

6. A process for the manufacture of a laminated article in which a foamed plastics core is covered, at least in part, with a fibrous composite material comprising fibre and vermiculite lamellae.

* * * * *